UNITED STATES PATENT OFFICE.

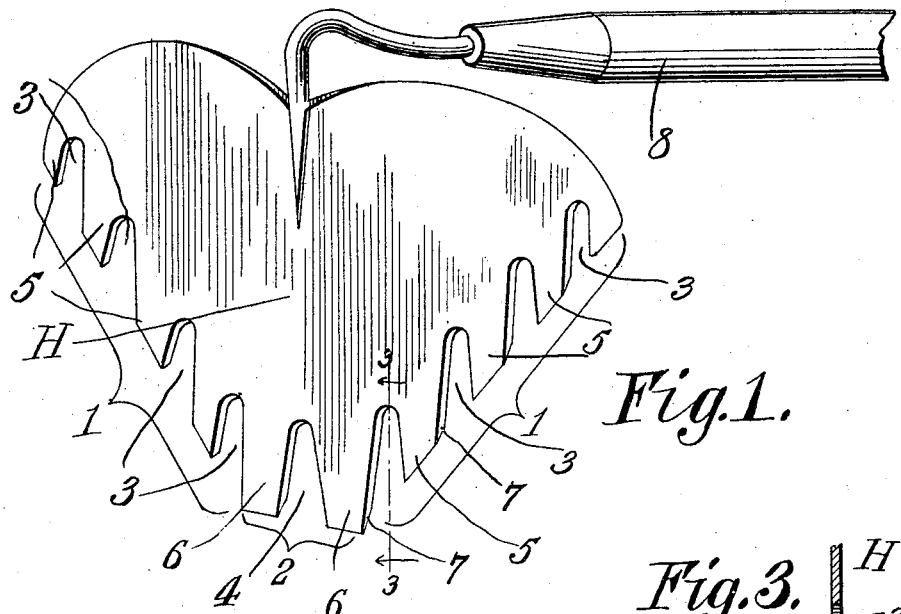
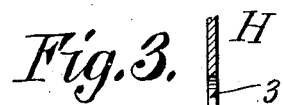
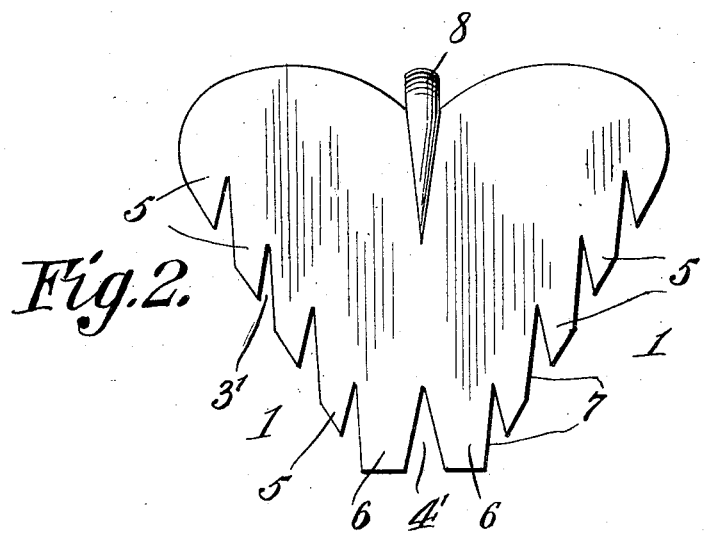

SIMON W. SHANKS, OF BENTON HARBOR, MICHIGAN.

HOE.

No. 880,925.

Specification of Letters Patent.

Patented March 3, 1908.

Application filed October 15, 1907. Serial No. 397,557.

*To all whom it may concern:*

Be it known that I, SIMON W. SHANKS, a citizen of the United States of America, residing at Benton Harbor, in the county of Berrien and State of Michigan, have invented new and useful Improvements in Hoes, of which the following is a specification.

This invention relates to hoes, and it has for its object to simplify and improve the construction and operation of this class of devices.

With these and other objects in view, which will readily appear as the nature of the invention is better understood, the same consists essentially in a hoe blade of peculiar and improved construction, the same being provided with inclined or obliquely disposed cutting edges which are provided with teeth or serrations for the purpose of facilitating the operation and increasing the efficiency of the hoe.

The invention further consists in the improved construction and arrangement of parts which will be hereinafter fully described and particularly pointed out in the claims.

In the accompanying drawing there has been shown several simple and preferred forms of the invention, it being, however, understood, that no limitation is necessarily made to the precise structural details therein exhibited, but that further changes, alterations and modifications within the scope of the invention may be resorted to when desired.

In the drawing,—Figure 1 is a perspective view illustrating a preferred form of the improved hoe. Fig. 2 is an end view showing, in elevation, a hoe blade of a slightly modified construction. Fig. 3 is a sectional detail view taken on the plane indicated by the line 3—3 in Fig. 1.

Corresponding parts in the several figures are denoted by like characters of reference.

The blade A of the improved hoe is provided with downwardly converging inclined or obliquely disposed straight side edges 1, 1, the lower extremities of which are separated or spaced apart by the bottom edge 2, which latter is of a length not exceeding a few inches. The edges 1 and 2 of the hoe blade are provided with notches or serrations, designated respectively 3, 4, serving to form suitably spaced teeth or cutting members which are designated respectively 5, 6; the teeth 5 at the side edges of the hoe blade being provided with inclined or obliquely disposed cutting edges, which, however, are in true longitudinal alinement while the edges of the teeth 6 are level or horizontally disposed when the hoe blade is not in active operation.

Under the construction illustrated in Fig. 1 of the drawings, the notches or serrations 3 and 4 are approximately of inverted U-shape; in Fig. 2 of the drawings the notches or serrations, which are here designated 3' and 4' respectively, are of inverted V-shape, and the shape of the teeth or cutting members will obviously be correspondingly modified. In either case the cutting edges of the teeth are beveled and suitably sharpened, as indicated at 7, so as to be thoroughly effective in operation; the teeth or cutting members may be maintained in good condition for operation by the use of an ordinary file, or, if preferred, by grinding upon a stone or emery wheel, and the serrations or interspaces between the teeth may likewise be maintained in proper condition by the use of an ordinary file, a round, half round, or triangular file being employed, as may be needed and required.

The hoe which is ordinarily used for weeding and other similar purposes, is provided, as is well known, with a single straight cutting edge; for cutting the roots of plants, especially when tough and fibrous roots are encountered, it is by no means efficient, and the use thereof frequently involves fatiguing labor, while the tool itself is frequently injured by ordinary work. The improved hoe of the present invention is provided with straight-edge teeth which will readily engage and enter the soil, while the toothed side edges will be found extremely efficient for severing roots that may be encountered in the soil.

It will be observed that the teeth at the several edges of the hoe blade have alined cutting edges; this is extremely important for the reason that the entrance of the blade into the soil is thereby facilitated, the side edges of the blade especially being arranged to work with a cutting and shearing action which greatly facilitates the operation and efficiency of the device.

The improved hoe will thus be found thoroughly useful and efficient for the purposes for which it is provided.

The improved hoe blade is obviously to be mounted in the usual manner, upon a handle, as shown at 8 in Fig. 1 of the drawings; the blade may also be manipulated by this handle to drag it along the ground adjacent to a row of growing plants, and it may be permitted to enter the ground for any desired depth, so that the soil loosened thereby will be thrown in the direction of the roots of the plants, which will thus be covered with fresh loose soil. When used in this manner the device will constitute a very useful and efficient hand cultivator, whereby the vigorous and successful growth of the plants will be promoted.

Having thus described the invention, what is claimed as new, is:—

A substantially triangular hoe having a broad point at its apex and downwardly converging inclined side edges, said point being vertically notched to provide teeth presenting relatively broad, straight, chisel-like edges, and said inclined side edges being also vertically notched to provide teeth having relatively broad, alined, chisel-like edges.

In testimony whereof I affix my signature in presence of two witnesses.

SIMON W. SHANKS.

Witnesses:
CALVIN SHANKS,
CARL SHANKS.